March 9, 1926.

H. R. POWER 1,576,219

SIGNAL AND SPOTLIGHT FOR MOTOR VEHICLES

Filed April 13, 1925

Inventor
H. R. Power.
by: Hazard and Miller
Attys.

Patented Mar. 9, 1926.

1,576,219

UNITED STATES PATENT OFFICE.

HOWARD R. POWER, OF LOS ANGELES, CALIFORNIA.

SIGNAL AND SPOTLIGHT FOR MOTOR VEHICLES.

Application filed April 13, 1925. Serial No. 22,888.

*To all whom it may concern:*

Be it known that I, HOWARD R. POWER, a citizen of the United States, residing at Los Angeles, in the county of Los Angeles and State of California, have invented new and useful Improvements in Signals and Spotlights for Motor Vehicles, of which the following is a specification.

This invention relates to equipment for motor vehicles and particularly to a signal and spotlight for motor vehicles.

It is well known that most fire trucks, police cars, emergency ambulances and the like are equipped with spotlights whose office is to warn motorists and pedestrains of the approach of the emergency car, rather than to illuminate the path of the oncoming motor car.

It is an object of this invention to provide a spotlight for use particularly on the class of motor vehicles described and means for rocking the spotlight to rapidly shift the projecting rays in order to attract attention.

It is sometimes difficult for a bystander, when first hearing a siren, to ascertain from what direction a car is approaching, and by providing for a comparatively rapid shifting of the spotlight rays in a vertical plane bystanders or motorists may more readily ascertain the direction from which the vehicle approaches.

Other objects and advantages will be made manifest in the following specification of an embodiment of the invention illustrated in the accompanying drawings, in which:

Figure 1 is a side view of a motor vehicle equipped with a signal and spotlight of the type referred to.

Figure 1:
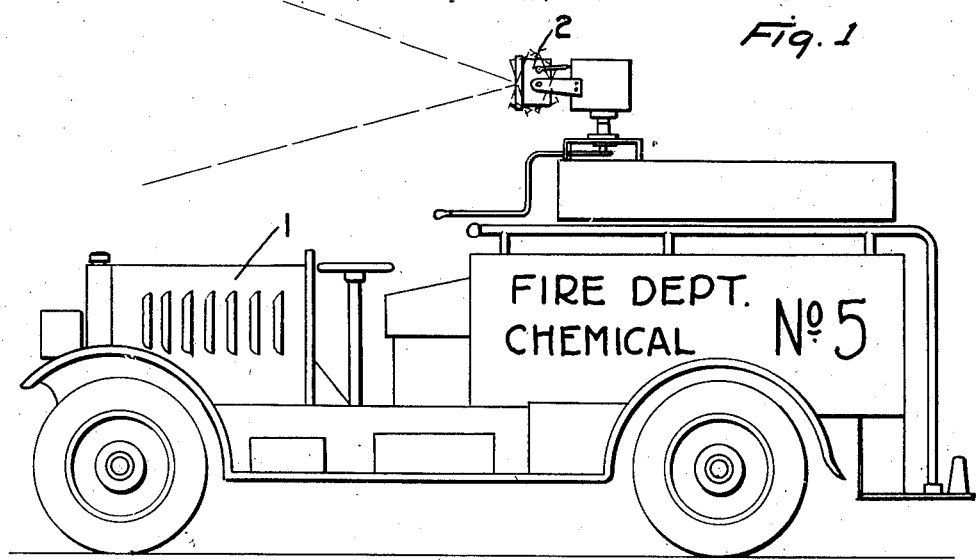
Figure 2:
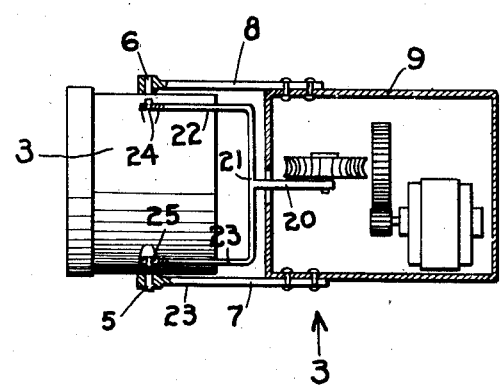
Figure 2 is a top view of the signal and spotlight with parts cut away to disclose the working mechanism.
Figure 3:
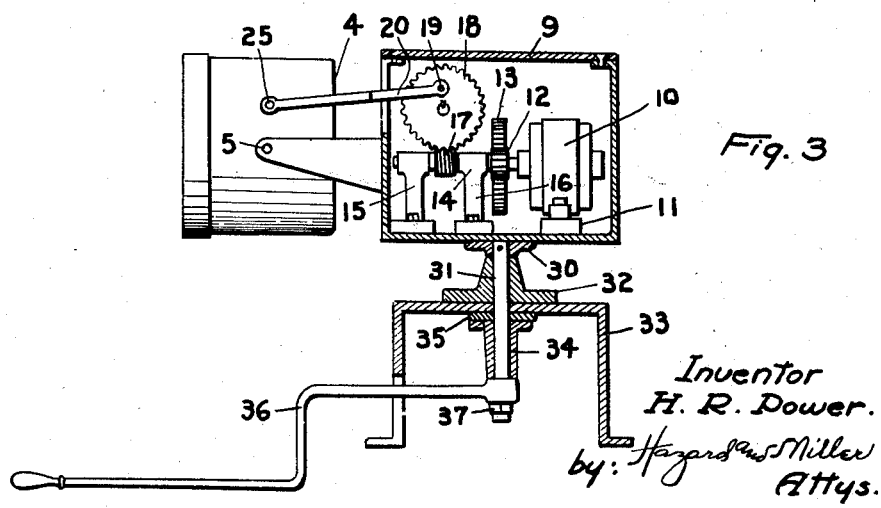
Figure 3 is a side view of the signal and spotlight with parts cut away taken in the direction of the arrow 3 of Figure 2.

The details of construction and operation of the invention are as follows:

A motor vehicle 1 herein illustrated as an emergency automobile such as a fire truck, is equipped in addition to the usual siren not herein shown, with a signal and spotlight 2 mounted upon any suitable position on the motor vehicle in order that its rays may not be obstructed.

The signal and spotlight comprises a spotlight 3 which may be of any desired type and is herein shown as having an outer drum 4 of substantially cylindrical exterior. Oppositely disposed upon the horizontal diameter of the drum 4 is a pair of pins 5 and 6 projecting outwardly from the drum, being adapted to pivotally engage a pair of brackets 7 and 8 which are rigidly secured as by riveting or welding to a housing 9 which encloses a mechanism hereinafter described.

The spotlight 3 is adapted to be shifted or rocked in a vertical plane upon the axis provided by the pivot pins 5 and 6. For the purpose of rocking the spotlight a driving mechanism is provided and comprises an electric motor 10 suitably mounted upon a base 11 within the housing 9. A pinion 12 keyed upon the outer end of the motor shaft engages a gear 13 which is rigidly mounted upon a shaft 14 supported by suitable bearings 15 and 16. Upon the shaft 14 intermediate of the bearings 15 and 16 is keyed a worm 17 which in turn engages a worm wheel 18 upon whose face is disposed a crank pin 19 and a driving rod 20 works from the crank pin 19.

The driving rod 20 is provided with a cross piece 21 which is bent to form a pair of parallel extensions 22 and 23, these being pivoted at opposite points on the wall of the spotlight drum on a plane parallel to pins 5 and 6 by means of pins 24 and 25. The extensions 22 and 23 may be retained upon the pins 24 and 25 by cotter pins or other suitable means.

In the operation of the invention it will be noted that when the motor 10 is properly connected in an electric circuit, the pinion 12 driving the larger gear 13 and the worm 17 driving the worm wheel 18 provides a very great reduction in the revolutionary speed of the worm wheel 18 as compared to the speed of the pinion 12 and a conversely greater power. The driving rod 20 working on the crank pin 19 will be reciprocated thereby causing the spotlight 3 to be rocked upon the pivot pins 5 and 6 and flashing the rays from the spotlight up and down in a substantially vertical plane. The speed at which the spotlight is rocked may be regulated by employing different ratios of gearing and the arc through which it passes may be determined by the distance of separation between the pivot pins 5 and 6 and the pivot pins 24 and 25.

The housing 9 is preferably mounted upon a head 30 of a pin 31, which extends vertically through a bearing 32 carried by a base 33 which is rigidly secured upon the motor vehicle. A sleeve 34 encloses the pin below the base 33 and a friction plate 35 is interposed between a flange at the upper end of the sleeve and the base 33. A crank, or handle 36, is rigidly secured to the lower end of the pin 31 as by means of a nut 37.

The spotlight mechanism may then be swung, by means of the handle, in a horizontal arc, to indicate, for instance, intention to turn to the right or left.

Various changes may be made without departing from the spirit of the invention. What is claimed is:

A signal and spotlight comprising in combination a base, a bearing mounted thereon, a pin extending vertically through the base and bearing, a housing supported by the bearing and having the pin attached thereto, an arm attached to the pin to swivel the pin and the housing, a pair of brackets attached to the housing, a spot light pivotally mounted in the brackets to swing on a horizontal axis, a crank pin rotatably mounted in the housing, a driving rod connected from the crank pin to the spot light and an electric motor having a train of gearing driving said crank pin, the crank pin being mounted on one of the gears.

In testimony whereof I have signed my name to this specification.

H. R. POWER.